Nov. 21, 1967     E. V. HENC     3,353,460
APPARATUS FOR WORKING SHEET MATERIAL
Filed May 21, 1965     4 Sheets-Sheet 1
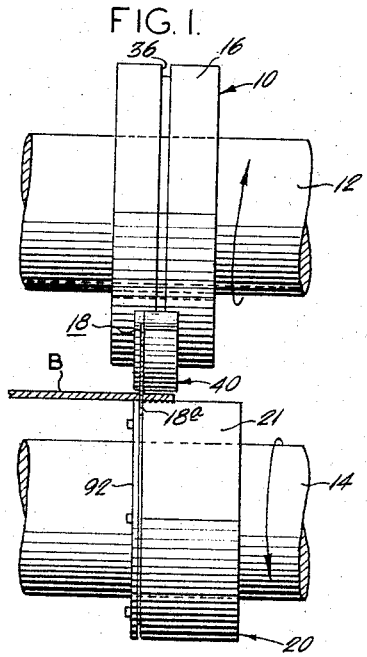
FIG. 1.
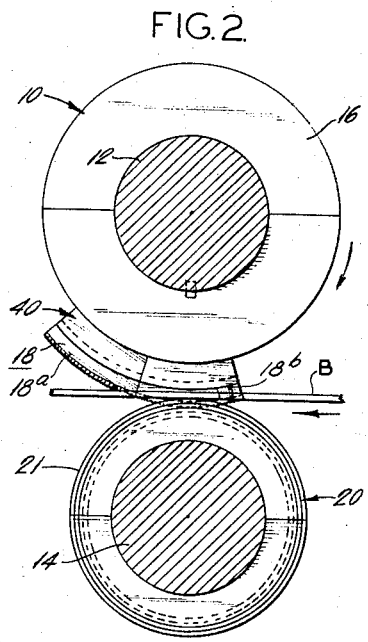
FIG. 2.
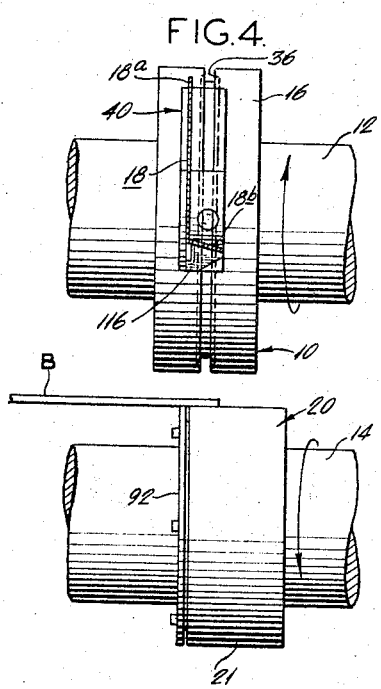
FIG. 4.
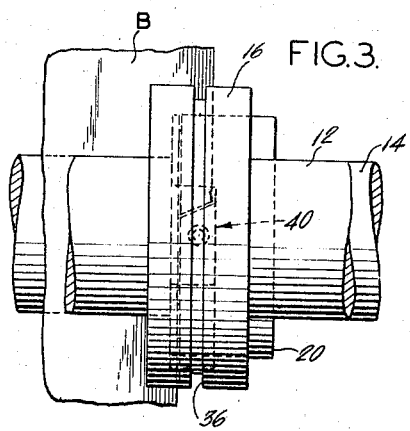
FIG. 3.
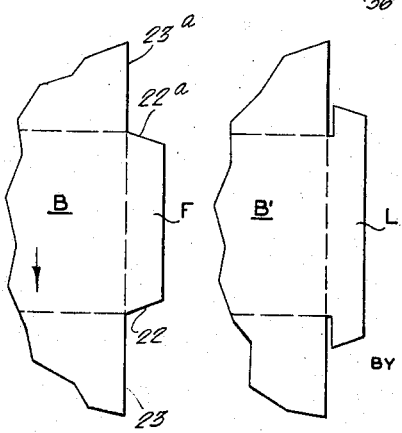
FIG. 5.     FIG. 8ª.
INVENTOR.
EDWARD V. HENC
BY Howson & Howson
ATTYS.

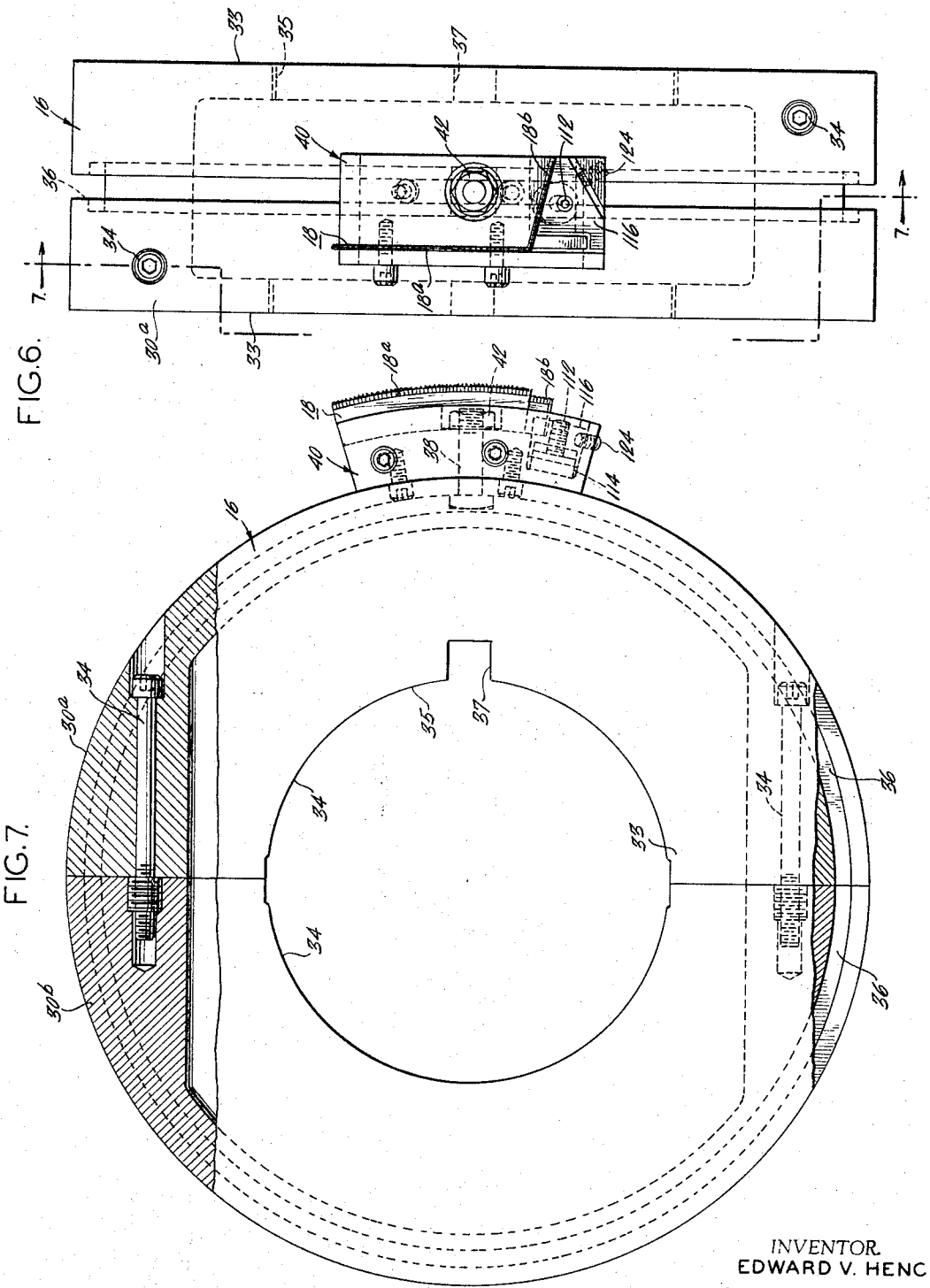

Nov. 21, 1967 — E. V. HENC — 3,353,460
APPARATUS FOR WORKING SHEET MATERIAL
Filed May 21, 1965 — 4 Sheets-Sheet 3
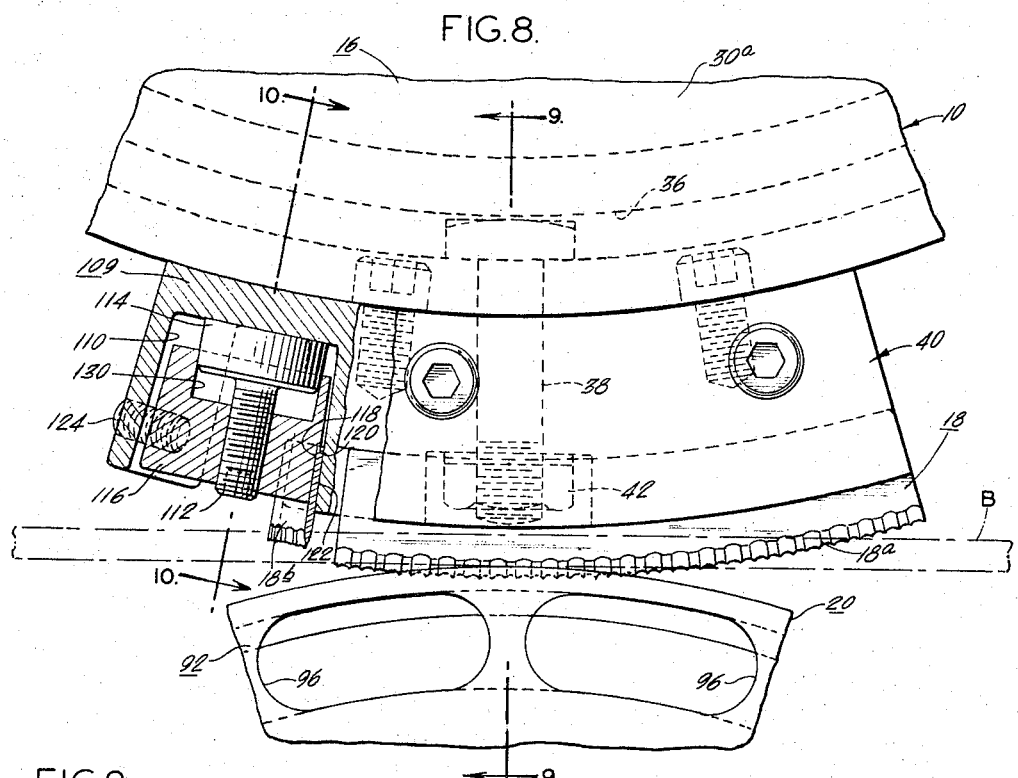
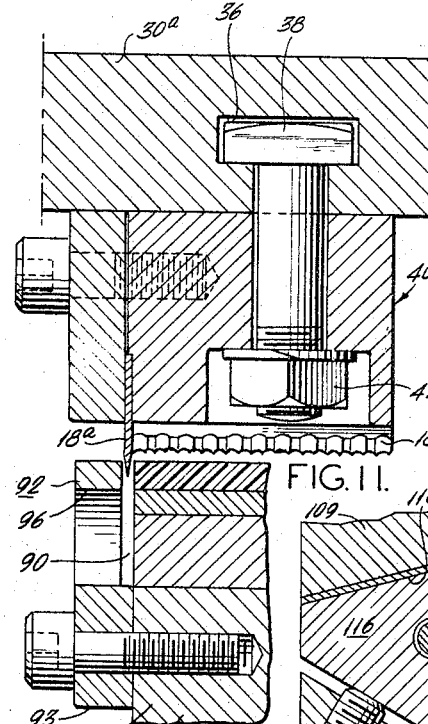
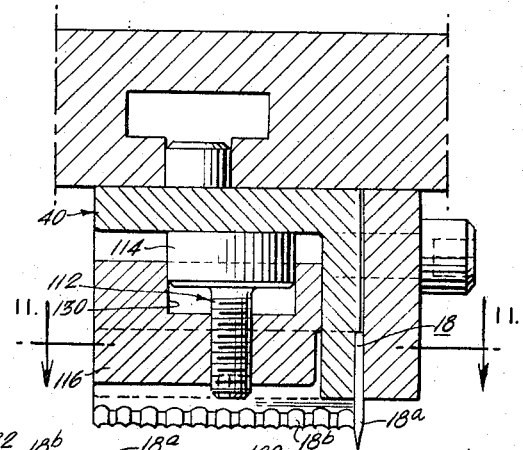
INVENTOR:
EDWARD V. HENC
BY Howson & Howson
ATTYS.

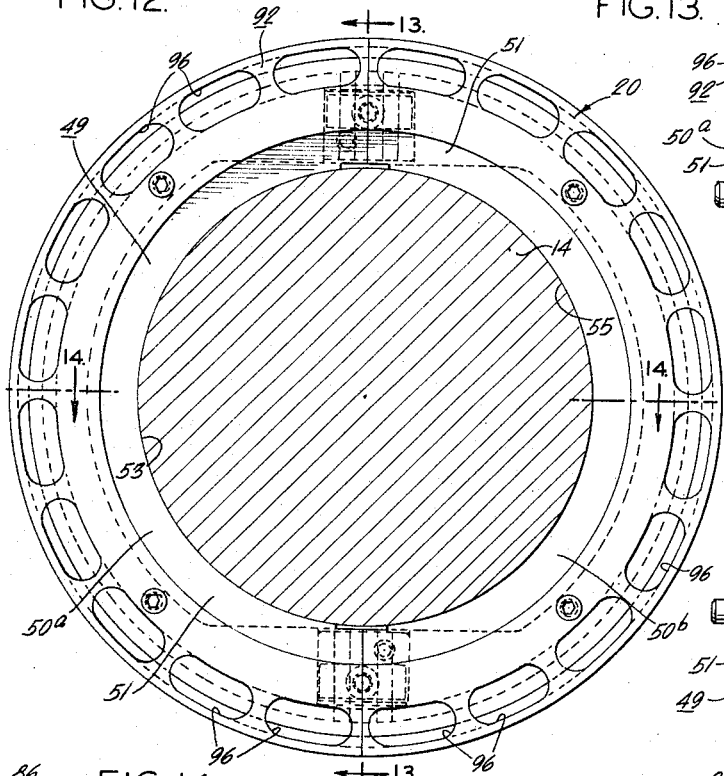
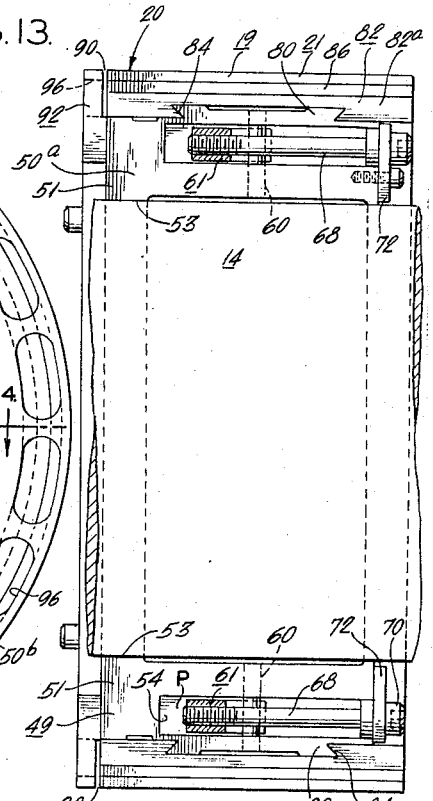
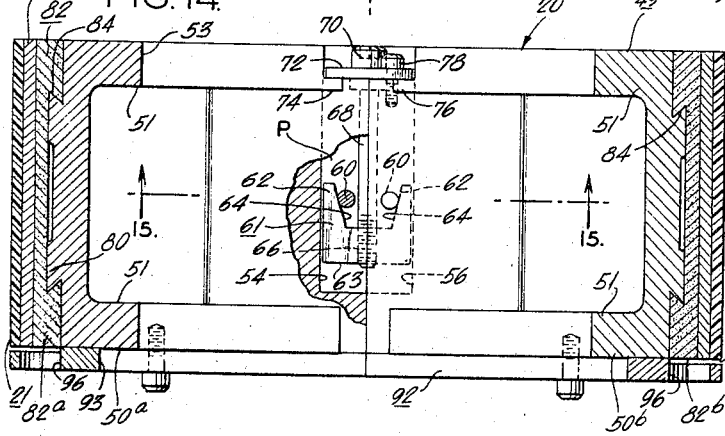
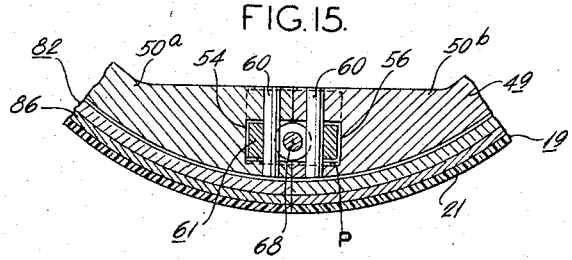
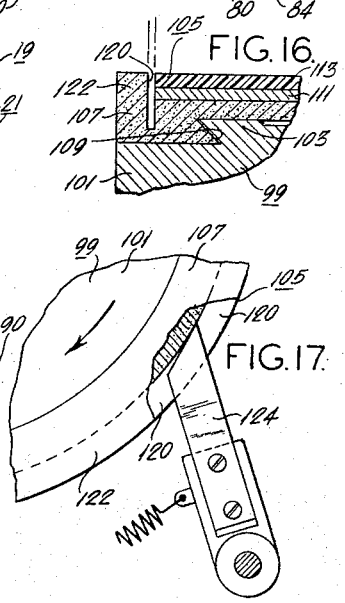
INVENTOR.
EDWARD V. HENC 3,353,460
APPARATUS FOR WORKING SHEET MATERIAL
Edward V. Henc, 302 Netherington Drive,
Broomall, Pa. 19008
Filed May 21, 1965, Ser. No. 457,582
12 Claims. (Cl. 93—58.2)

The present invention relates to apparatus for cutting or trimming stock sheet material, for example paper or corrugated board. More particularly, the present invention relates to improvements in rotary die cutting apparatus used for this purpose.

These rotary die cutting apparatus generally comprise a rotatable die head which mounts a cutting blade and a rotatable backing anvil against which the blade acts to cut or trim sheet material passing through the nip of the die head and anvil. The backing anvil is usually provided with a cover made of a flexible, resilient material such as rubber or plastic which is fixedly mounted on the backing anvil. Thus, in the operation of the apparatus the cutting blade engages through the sheet material and embeds in the face of the resilient cover. It has been found that in some instances the blade does not shear all of the fibers cleanly and tends to impregnate some fibers into the resilient cover of the backing anvil. Thus over a comparatively short period of use, the resilient cover of the anvil becomes swelled with entrapped fibers thereby requiring replacement which in turn necessitates shutdown, both of which are costly and time consuming. Furthermore, it has been found that swelling of the resilient cover of the backing anvil produces an uneven support surface for the sheet material thereby resulting in a slight deviation in the finished pattern of a blank from the desired pattern.

These rotary die cutting apparatus may be used to form the stitch or glue tab or flap of a box. Conventionally, when the apparatus is used for this purpose, the die head mounts a first blade to cut the trim edge of the gule flap, this blade being parallel to a plane transverse to the rotational axis of the die head and a second angularly disposed blade to form the side edge stitch or glue tab. In these conventional rotary die cutters, the blades engage the cover of the backing anvil at the approximate same place during operation, thus presenting the problem of swelling of the anvil cover in this area due to entrapped fibers which consequently necessitates replacement of the cover and other problems noted above.

In order to accommodate sheet material of varying thicknesses, the blades are usually adjustably mounted in the die head so that they may either be raised or lowered depending on the type of material being run. A typical type of mounting arrangement for a cutting blade is shown in my prior patent entitled, "Rotary Die Cutting Apparatus and Method," No. 3,119,312 issued Jan. 28, 1964. As shown therein the blade is mounted on a saddle bolted to the die head, the saddle carrying a metal strip shaped according to the pattern desired and secured to the saddle by means of bolts. The body portion of the strip is channeled to receive the blade, the blade being secured in the channel by bearing pins. In this assembly, the cutting blade is adjusted by unbolting the saddle from the die head and placing shims between the saddle and die head. With this type of mounting arrangement, it is tedious and difficult to accurately adjust the blade. Moreover, this type of mounting arrangement does not provide a firm and rigid support for the blade.

With the above in mind, an object of the present invention is to provide an improvement in rotary die cutting apparatus which eliminates the problems and drawbacks inherent in present rotary die cutting apparatus discussed above. To this end in accordance with the present invention, the resilient cover of the anvil instead of being fixedly mounted thereto is mounted in such a manner that the cover or blanket may move circumferentially relative to the backing anvil. By this arrangement, when the peripheral edge of the cutting blade and the peripheral surface of the blanket are rotated relative to one another at different peripheral speeds, the engagement of the blade edge in the resilient blanket causes the blanket to "creep" or to move a small amount circumferentially during each cycle of rotation thereof whereby the stitch lap blade engages the blanket at a different point during each revolution. In the present instance this is accomplished by making the distance from the rotational axis of the die head to the peripheral edge of the second side edge blade smaller or greater than the distance from the rotational axis of the backing anvil and the peripheral surface of the blanket. Thus as the die head and backing anvil are rotated at the same r.p.m., there is a slight difference between the peripheral speed of the side edge blade and the peripheral speed of the blanket. Due to the difference in peripheral speed of the side edge blade and the outer surface of the blanket, the blade in each cycle causes the blanket to move circumferentially relative to the backing anvil with the result that the blade engages the blanket at a different spot or location during each cycle of operation. By this arrangement the life of the blanket is extended considerably. Further, since the blade does not engage the same portion of the blanket as in prior apparatus which portion tends to become impregnated with fibers which dull the blade, the cutting life of the blade is also extended.

In accordance with another feature of the present invention, the trim edge blade does not engage the blanket but engages in an annular slot in the backing anvil. This also extends the life of the blanket and the cutting effectiveness of the blade. In one embodiment of the invention, there is provided a detachably mounted ring at one end of the backing anvil head which is spaced from one axial end of the blanket to define a circumferentially extending groove within which the trim edge blade engages. The ring is also provided with a plurality of circumferentially spaced openings so that accummulation of paper dust or the like in the groove may be vented through the openings. This, of course, saves the wear on the blanket and insures a clean operation and also extends the cutting life of the trim edge blade.

An additional feature of the present invention is the specific mounting arrangement of the blade for cutting the side edge of the glue flap or stitch lap which facilitates easy and quick adjustment of the blade and also provides a firm and stable support for the blade.

With the foregoing in mind, an object of the present invention is to provide a rotary die cutting apparatus for cutting sheet material which is characterized by novel features of construction and arrangement including a so-called "creeping anvil" whereby the life of the resilient blanket of the backing anvil is extended thereby minimizing the amount of downtime of the apparatus.

Still another object of the present invention is to provide a rotary die cutting apparatus including a novel arrangement for the trim edge blade which also minimizes wear on the resilient blanket of the backing anvil.

Still another object of the present invention is to provide a comparatively simplified and very effective mounting arrangement for the side edge blade whereby the blade may be adjusted easily and quickly to accommodate sheet material of various cross sections.

Still a further object of the present invention is to provide a rotary die cutting apparatus which is of comparatively simplified construction and which is relatively economical to manufacture and is fully effective in operation and use.

These and other objects of the present invention and the various features and details of the operation and construction thereof are hereinafter more fully set forth with reference to the accompanying drawings, wherein:

FIG. 1 is a fragmentary side elevational view of a rotary die cutting apparatus in accordance with the present invention;

FIG. 2 is an end view of the die cutting apparatus shown in FIG. 1;

FIG. 3 is a plan view of the die cutting apparatus shown in FIG. 1;

FIG. 4 is a view similar to FIG. 1 except showing a position of the blades after cutting a blank;

FIG. 5 is a fragmentary view of a finished blank;

FIG. 6 is an enlarged view of the die head;

FIG. 7 is a sectional view taken on line 7—7 of FIG. 6;

FIG. 8 is an enlarged fragmentary view showing the cutting blade in cutting position relative to the resilient anvil;

FIG. 8a is a fragmentary view of a blank having an extended stitch lap;

FIG. 8b is a fragmentary view similar to FIG. 11 showing the cutting blade configuration for making an extended stitch lap shown in FIG. 8a;

FIGS. 9 and 10 are enlarged sectional views taken on lines 9—9 and 10—10 respectively of FIG. 8;

FIG. 11 is an enlarged sectional view taken on line 11—11 of FIG. 10;

FIG. 12 is an end or face view of the backing anvil;

FIGS. 13 and 14 are enlarged sectional views taken on line 13—13 and 14—14 of FIG. 12;

FIG. 15 is a fragmentary sectional view taken on line 15—15 of FIG. 14;

FIG. 16 is a fragmentary sectional view of a modified form of anvil head;

FIG. 17 is a fragmentary view showing the anvil head of FIG. 16.

Referring now to the drawings, there is illustrated in FIGS. 1 and 2 a rotary die cutting apparatus 10 in accordance with the present invention. The apparatus includes a die shaft 12 and an anvil shaft 14 which are supported by suitable conventional means for relative rotation in the directions indicated. The die shaft 12 mounts a die head 16 which in turn carries a cutting blade 18 and the anvil shaft 14 mounts a backing anvil 20 including a cover assembly 19 having a cover 21 made of a resilient, flexible material such as rubber against which the blade engages during cutting of a blank B.

Referring to FIG. 5, the rotary die cutting apparatus is arranged to cut the stitch lap or glue flap F of the blank B. To this end the cutting blade 18 includes a first trim blade section 18a to cut the trim edge 23 of the end of the blank B and a second angled blade section 18b to cut one side edge 22 of the flap F. Another die cutting apparatus similar in arrangement and construction to that shown in FIG. 1 may be employed in series to cut the opposite side edge 22a and trim edge 23a of the blank B. Thus, in the operation of the device as blanks are fed between the backing anvil and die head, the blade sections 18a and 18b cut through the blank to form the stitch lap as illustrated in FIG. 5. It will be understood, of course, that the die head of each of a pair of such apparatus would have the cutting blades 18a and 18b oppositely oriented in their respective holders 40, since the edge 22 of the blank is cut following the initial cutting of edge 23 while edge 22a precedes the final cutting of trim edge 23a. However, the details of the respective die heads are identical and in the drawings similar parts of either die head may bear the same reference characters.

The blank B may be a box blank which is scored and slotted in other conventional apparatus prior to formation of the stitch lap or after formation thereof. Even though the die cutting apparatus of the present invention is illustrated and described in connection with cutting a blank B to form a glue flap or stitch lap F, it is to be understood that the principle of the invention applies to other forms of die cutting apparatus for performing other cutting and blanking operations.

Considering now more specifically the structural details and arrangement of the rotary die cutting apparatus and with reference to FIGS. 6 and 7, the die head 16 is comprised of mating semi-circular sections 30a and 30b which are held together by means of bolts 34. Each die head section has a pair of radially inwardly projecting flanges 33 terminating in a semi-circular edge 35 to provide in the assembled relation a pair of spaced centrally disposed circular openings 34 conforming to the shaft 12. A key slot 37 is provided in the semi-circular edge 35 of the flanges of one of the die head sections 30a to secure the assembly to the shaft. Each die head section is provided with a T-shaped groove 36 in its outer peripheral surface which mounts a T-slot bolt 38 which secures a cutting blade holder 40 in a selected position peripherally of the die head 16. The T-shaped bolt has a nut 42 for securing the holder 40 in a selected position on the peripheral surface of the die head 16.

The backing anvil 20 as best illustrated in FIGS. 12-15 inclusive, also comprises a hub 49 consisting of a pair of identical semi-circular anvil sections 50a and 50b. Each section of the backing anvil 20 has a pair of axially spaced radially inwardly projecting flanges 51, each flange terminating in a semi-circular edge 53 to provide in the assembled relation of the backing anvil a pair of axially spaced centrally dsposed circular openings 55 conforming to the periphery of the shaft 14.

In the present instance a comparatively simple and effective means is provided for securing the anvil sections 50a and 50b on the shaft 14. To this end the section 50a has an inset cutout portion 54 at its terminal ends at diametrically opposed points and the section 50b also has an inset cutout portion 56 at its terminal ends at diametrically opposed points so that in the assembled relation, the cutout sections 54 and 56 define a pair of pockets P. A radially directed pin 60 is mounted in each of the inset cutout portions. Now in order to assemble the sections 50a and 50b together and to the shaft 14, a wedging element 61 having a pair of wings 62 with inclined inner cam faces 64 is positioned in the pocket P with the cam faces 64 engaging the pins 60 (see FIG. 14). The base 63 connecting the wings of the wedging element has a threaded opening 66 to receive a bolt 68 which when turned, moves the wedging element axially relative to the pins 60 whereby the inclined cam faces 64 draw the sections 50a and 50b together and clamp them onto the shaft. The head 70 of the bolt 68 bears against a face plate 72 which is supported on shoulders 74 and 76 of the sections 50a and 50b respectively, the face plate 72 being secured to one of the sections, in the present instance 50b, by means of a screw 78. This means for assembling the halves of the backing anvil together and to the shaft is comparatively simple and facilitates easy and quick removal of the anvil head from the shaft when desired.

In accordance with the present invention, the backing anvil is characterized by novel features of construction and arrangement whereby during operation of the die cutting apparatus, the blade 18b for cutting the side edge of the flap F engages a different portion of the resilient blanket of the backing anvil during each cycle thereof. To this end in accordance with the present invention, the cover assembly 19 is slideably mounted on the hub 49 for relative movement circumferentially thereof. As best illustrated in FIG. 14, the cover assembly 19 comprises a sleeve 82 composed of two semi-annular sections 82a and 82b, a basic cover 86 secured to the outer periphery of the sleeve sections and which is made, for example of a woven fabric impregnated with rubber and a resilient blanket secured to the outer surface of the basic cover by means of a contact adhesive, the blanket being made of polyurethane or rubber. The sleeve sections are preferably made of fiberglass which is light, rigid and able to effectively withstand wear. Moreover by this construction, the assembly 19 moves freely relative to the hub 49 to provide the desired "creeping" action with little or no lubrication. In the present instance, relative movement of the cover assembly 19 and hub 49 is accomplished by providing a dovetail projection 80 on the outer periphery of the hub 49 and forming a dovetail slot 84 on the inner surface of each of the sleeve sections 82a and 82b. In assembling the backing anvil, one section of the cover assembly 19 is slid onto one section of the hub 49, the other section of the cover assembly 19 is slid onto the other section of the hub and then the entire assembly is secured in place on the shaft 14 in the manner noted above.

In operation, the apparatus is set so that the peripheral speed of the edge of the cutting blade 18b and the outer periphery of the resilient blanket 21 are different. Thus, during relative rotation of the backing anvil and die head, the blade 18b for cutting the side edge of the flap F engages in the resilient blanket 21 a different peripheral location during each complete cycle of the backing anvil by reason of the fact that the blanket assembly 19 "creeps" or moves relative to the hub 49. In the present instance this is accomplished by making the distance D-1 between the central axis of the shaft 12 and the peripheral edge of the cutting blade 18b different from the distance D-2 between the axis of the shaft 14 and the peripheral surface of the resilient blanket 21. Thus, by this arrangement the shaft 12 and 14 may be rotated in opposite directions at the same r.p.m. and there is a difference in the peripheral speed of the cutting edge of the cutting blade 18b relative to the peripheral surface of the blanket 21. Accordingly, the blade effects "creeping" of the cover 21 of the backing anvil whereby the blade engages a different portion of the blanket 21 during successive cycles thereof. By this arrangement, swelling of the blanket 21 due to continuous embedding of fibers in the same spot on the blanket, which was characteristic of previous devices, is obviated and the life of the blanket is thereby extended. Furthermore, this embedding of fibers tends to dull the cutting edge of the blade in prior devices so that in the apparatus of the present invention, the useful life of the cutting blade is also extended.

Another feature of the die cutting apparatus of the present invention is the provision of the circumferentially extending groove in the backing anvil within which the blade 18a for cutting the trim edge of the flap F engages thereby minimizing wear on the resilient blanket. In the present instance the circumerentially extending groove or slot 90 is defined by a ring 92 secured to one axial end face of the hub 49, the ring 92 having a wider base 93 to define the circumferentially extending groove. As best illustrated in FIG. 12, the ring has a plurality of oval shaped circumferentially spaced openings 96 which communicate with the groove 90 so that any paper dust or particles formed during the cutting operation are vented from the groove to prevent accumulation in the groove.

A modified form of groove arrangement for the backing anvil is shown in FIGS. 16 and 17. The backing anvil 99 is similar to that described above and includes a two-piece hub 101 having a dovetail projection 103 and a cover assembly 105 mounted on the hub for movement circumferentially thereof. The cover assembly 105 includes an inner two-piece sleeve 107 having a dovetail slot 109 to engage with the projection 103 on the hub, a basic cover 111 secured to the outer surface of the sleeve 107 and a resilient blanket 113 made a polyurethane or rubber secured to the basic cover by means of a contact adhesive. However, in the present instance, a circumferentially extending groove 120 adjacent one axial end of the backing anvil is formed in the sleeve 107, the outer side wall of the groove being formed by an extended portion 122 of the sleeve having a top edge aligned with the outer surface of the blanket 113. In order to prevent accumulation of paper particles in the groove 126, a resiliently biased finger 124 is provided which is pivotally mounted to the frame of the apparatus and engages in the groove 120.

Still another feature of the present invention is the specific mounting arrangement for the blade 18b for cutting the side edge of the flap F to facilitate adjustment of the blade when cutting sheet material of varying thicknesses. The adjustable mounting arrangement is best illustrated in FIGS. 8–11 inclusive. As illustrated therein, the blade holder section 109 for the angle blade has a cavity therein which opens radially outwardly and seated within the cavity 110 in an inverted position is an adjusting screw 112 with its head 114 seated on a wall of the cavity 110. A clamp block 116 is threadedly mounted on the threaded shank of the adjusting screw 112 and as illustrated in FIG. 11, is of generally triangular shape. The face 118 of the clamping block 116 is of stepped configuration to define a seat 120 against which the shank portion of the blade abuts. The blade is clamped between the face 118 of the clamping block and the sidewall 122 of the holder by means of a set screw 124 mounted in the block and engaging the slanted face 126 of the clamping block 116. Now, when it is desired to adjust the angle blade either up or down, the set screw 124 is backed off out of engagement with the sidewall 126 of the clamping block 116 and by turning the screw 112 with a suitable key, the block 116 is either raised or lowered. In the present instance, the underside of the clamping block 116 is provided with an enlarged counter sunk recess 130 within which the head 132 of the adjusting screw 112 is guided. Of course, raising and lowering of the block raises or lowers the seat 120 against which the blade bears and when the desired positioning of the blade has been set, the set screw 124 is threaded inwardly to lock the clamping block in place. It is noted that by providing a circumferentially extending groove in the backing anvil for the blade 18a cutting the trim edge, it is not necessary to mount the blade 18a for adjustment.

There is shown in FIG. 8a another form of blank B' having an extended stitch lap L which may be made with rotary die cutting apparatus in accordance with the present invention. In forming this type of blank with the extended stitch lap, and with reference to FIG. 8b, a trim edge blade 118a for cutting the trim edge 123 extends beyond the clamping block 216 as illustrated and the stitch lap blade 118b mounting in the holder is of generally Z-shaped configuration.

While particular embodiments of the present invention have been illustrated and described herein, it is not intended to limit the invention and changes and modifications may be made therein within the scope of the following claims.

I claim:

1. A rotary die cutting apparatus comprising a rotatable die head, means mounting a cutting blade on the outer periphery of said die head, a rotatably mounted backing anvil, said backing anvil comprising a hub and a cover assembly mounted on said hub including an outer resilient blanket member against which the cutting blade engages during rotation of the die head and backing anvil, means mounting the cover assembly for movement circumferentially relative to the hub, and means mounting the die head and backing anvil for rotation so that the peripheral edge of the cutting blade and peripheral surface of the resilient blanket are moving at different relative speeds whereby the cutting blade effects movement circumferentially of the cover assembly relative to the hub so that the die blade engages a different portion of the resilient blanket during successive cycles of the die head.

2. A rotary die cutting apparatus as claimed in claim 1 wherein the hub comprises a pair of semi-circular anvil sections, each section having a dovetail projection, and wherein said cover assembly includes an inner sleeve having a circumferentially extending dovetail slot within which said dovetail projection engages whereby the cover assembly may be moved circumferentially relative to the hub.

3. A rotary die cutting apparatus as claimed in claim 2 wherein said sleeve member is made of fiberglass.

4. A rotary die cutting apparatus as claimed in claim 1 wherein said cover assembly includes an inner sleeve confronting the hub, a basic cover made of a woven fabric impregnated with rubber secured to the sleeve and wherein the outer resilient blanket is made of rubber and is secured to the basic cover by means of a contact adhesive.

5. A rotary die cutting apparatus comprising a rotatable die head, means mounting a cutting blade on the outer periphery of said die head including a trim edge blade section disposed in a plane transverse to the rotational axis of the die head, a rotatably mounted backing anvil, said backing anvil comprising a hub and a cover assembly mounted on said hub including an outer resilient member against which the cutting blade engages during operation of the apparatus, means mounting the cover assembly for movement circumferentially relative to the hub, and means mounting the die head and backing anvil for rotation so that the peripheral edge of the cutting blade and peripheral surface of the resilient blanket are moving at different relative speeds whereby the cutting blade effects movement circumferentially of the cover assembly relative to the hub so that the die blade engages a different portion of the resilient outer cover during successive cycles of the die head, and an annular ring secured to one axial end face of the backing anvil having a portion thereof spaced from the axial end face to define a circumferentially extending groove within which the trim edge blade engages.

6. A rotary die cutting apparatus as claimed in claim 5 including means defining a plurality of circumferentially spaced openings in said ring whereby paper dust and the like which accumulates in said groove is vented from the groove.

7. A rotary die cutting apparatus comprising a rotatable die head, means mounting a cutting blade on the outer periphery of said die head including a trim edge blade section disposed in a plane transverse to the rotational axis of the die head, a rotatably mounted backing anvil, said backing anvil comprising a hub and a cover assembly mounted on said hub including an outer resilient member against which the cutting blade engages during operation of the apparatus, means mounting the cover assembly for movement circumferentially relative to the hub, and means mounting the die head and backing anvil for rotation so that the peripheral edge of the cutting blade and peripheral surface of the resilient blanket are moving at different relative speeds whereby the cutting blade effects movement circumferentially of the cover assembly relative to the hub so that the die blade engages a different portion of the resilient outer cover during successive cycles of the die head, said cover assembly including a sleeve confronting the hub and having means defining an annular groove adjacent and spaced inwardly from one axial end of said sleeve to define a circumferentially extending groove within which the trim edge blade engages.

8. A rotary die cutting apparatus as claimed in claim 7 including a spring biased finger engaged in said groove which serves to clear the groove of any paper dust or the like which may accumulate therein.

9. A rotary die cutting apparatus comprising a first shaft, a die head adapted to be mounted on said first shaft, said die head comprised of a pair of semi-annular members, each member having a semi-circular inner edge so that in the assembled relation they define a circle conforming to the peripheral surface of the shaft, a second shaft, a backing anvil mounted on said second shaft comprising a hub portion composed of semi-annular anvil sections, an outer cover assembly and means for maintaining the anvil sections in assembled relation on said second shaft, means mounting the cover assembly for movement circumferentially relative to the hub, and means mounting the die head and backing anvil for rotation so that the peripheral edge of the cutting blade and peripheral surface of the resilient blanket are moving at different relative speeds whereby the cutting blade effects movement circumferentially of the cover assembly relative to the hub so that the die blade engages a different portion of the resilient outer cover during successive cycles of the die head.

10. A rotary die cutting apparatus as claimed in claim 9 including means defining a pair of diametrically opposed pockets in the hub portion, a pair of radially directed pins in each of the pockets, a wedging element including a pair of wings having cam surfaces engaging the pins and means for moving the wedge element relative to the pins to draw the anvil sections of the hub tightly on the shaft.

11. A rotary die cutting apparatus comprising a rotatable die head, means mounting a cutting blade on the outer periphery of said die head, a cutting blade holder, means defining a recess in the cutting blade holder, a clamping block mounted in said recess having an internally threaded opening, an adjusting screw mounted in said threaded opening adapted to adjust the block relative to the blade holder and fastening means for securing the block against movement relative to the holder, said cutting blade engaged between said adjusting block and the holder, a rotatably mounted backing anvil, said backing anvil comprising a hub and a cover assembly mounted on said hub including an outer resilient blanket member against which the cutting blade engages during rotation of the die head and backing anvil, means mounting the cover assembly for movement circumferentially relative to the hub, and means mounting the die head and backing anvil for rotation so that the peripheral edge of the cutting blade and peripheral surface of the resilient blanket are moving at different relative speeds whereby the cutting blade effects movement circumferentially of the cover assembly relative to the hub so that the die blade engages a different portion of the resilient blanket during successive cycles of the die head.

12. A rotary die cutting apparatus as claimed in claim 11 wherein the adjusting screw head engages in a recessed opening in one side of the clamping block for guiding the same.

No references cited.

WILLIAM W. DYER, Jr., *Primary Examiner.*

GERALD A. DOST, *Examiner.*